United States Patent [19]

Watson

[11] Patent Number: 4,626,067

[45] Date of Patent: Dec. 2, 1986

[54] METHOD OF BREAKING OUT AND TERMINATING FIBER OPTIC ELEMENTS FROM A MULTIFIBER CABLE

[75] Inventor: David B. Watson, Batavia, Ill.

[73] Assignee: Cooper Industries, Inc., Houston, Tex.

[21] Appl. No.: 403,095

[22] Filed: Jul. 29, 1982

[51] Int. Cl.[4] .......................... G02B 6/36; G02B 7/26
[52] U.S. Cl. ......................... 350/96.20; 350/96.22
[58] Field of Search ................. 350/96.20, 96.21, 96.22

[56] References Cited

U.S. PATENT DOCUMENTS

| | | | |
|---|---|---|---|
| 4,288,107 | 9/1981 | Schwartze | 285/137 R |
| 4,298,415 | 11/1981 | Nolf | 156/85 |
| 4,339,171 | 7/1982 | Makuch et al. | 350/96.20 |

OTHER PUBLICATIONS

Belden Corp. Bulletin T/FO-8, Issue 1, L/HA, "Attachment of Amphenol Series 905/906 Fiber Optic Connectors".
Sigmaform Corporation Advertisement MMT, "Military Approved Heat Shrinkable Cable Crotch Boots Three Legs".

Primary Examiner—William L. Sikes
Assistant Examiner—Robert E. Wise
Attorney, Agent, or Firm—Fitch, Even, Tabin & Flannery

[57] ABSTRACT

Multiple fibers are broken out of multifiber cables and sheathed in tubing segments which permit the sheathed fibers to be terminated as single optical fiber conduits. The cable jacket is cut back exposing a plurality of buffer tube-encased optical fibers. The tubing segments, each having a yarn strengthening member extending from both ends, are slipped onto the buffer tubes leaving a slight discontinuity between the end of the jacket and the inner ends of the tubing segments. The yarn strengthening members are wrapped and glued around the buffer tubes in the discontinuity. At the other end, the optical fibers are terminated in a conventional manner in high performance connectors with the strengthening members firmly attached to the connectors. The strengthening members of the tubing segments, attached at one end to the cable and at the other end to the termination connectors, relieve stress on the optic fibers and provide terminations with substantial pull-out strength.

1 Claim, 8 Drawing Figures

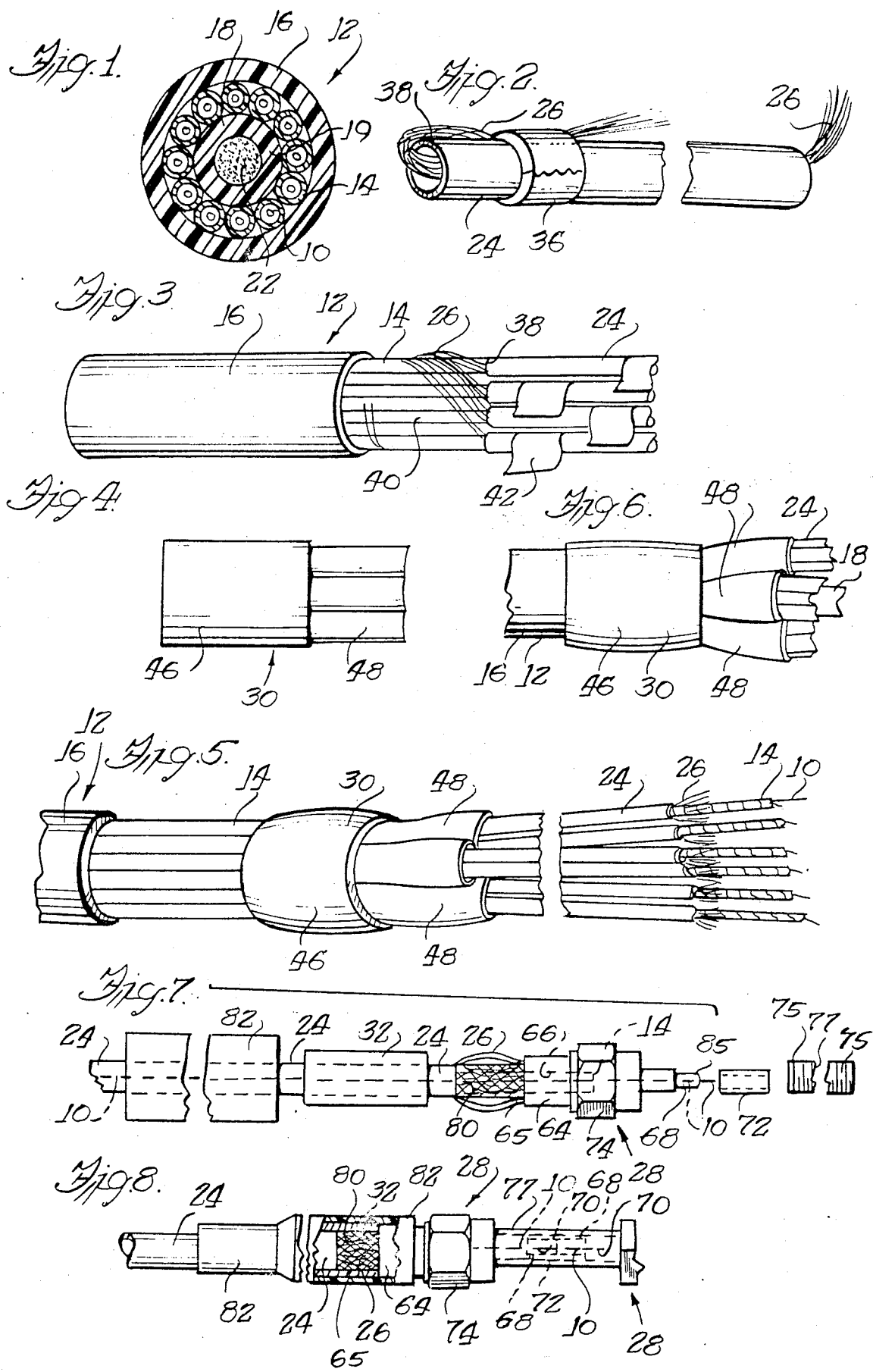

METHOD OF BREAKING OUT AND TERMINATING FIBER OPTIC ELEMENTS FROM A MULTIFIBER CABLE

The present invention relates to fiber optic terminations and more particularly to breakout and termination of cable having multiple fiber optic elements.

BACKGROUND OF THE INVENTION

For many purposes, fiber optics provide superior signal transmission to electrical signal transmission. Fiber optic elements are particularly useful for transmitting distortion-free signals over short or intermediate distances in locations where the concentration of electrical transmission is substantial creating significant electrical flux that interferes with good electrical signal transmission.

In order to carry the amount of information necessary in many types of data transmission, multifiber optical cable is frequently used in optical transmission systems. At the cable terminus, the individual fibers are "broken out" of the cable, that is freed from the outer jacket, and terminated by connecting them to light signal producing apparatus, e.g., light emitting diodes, or optical detectors.

A typical multifiber cable contains an outer jacket of polymeric material, such as polyvinyl chloride, a central strengthening member, and a plurality of buffer tubes surrounding the strengthening member in which the optical fibers are loosely retained. In a typical termination of a multifiber cable, the outer jacket is cut away to allow the buffer tube-protected fibers to be separately connected to optical transmitting or receiving units. The end of each buffer tube is cut back, and the ends of the optical fiber and cut-back buffer tubes are inserted and glued into connectors. The ends of the fibers are polished by conventional means, and the connectors are mated with alignment sleeves which hold the polished optical fiber ends closely adjacent to the optical detecting or transmitting units or in close proximity to the end of a similar optical fiber. The adhesion of the optical fibers to the connectors provided by the glue, e.g., epoxy, is relatively weak, typically providing only about five pounds of pull-out strength. Where human activity is considerable at the breakout location, the fibers may be inadvertantly dislodged from the fitting. Even if the fiber is not dislodged, jarring of an optical fiber held only by glue may introduce noise in the optical signal. There exists a need for improved breakouts and terminations for multifiber optical cable.

BRIEF DESCRIPTION OF THE DRAWINGS

FIG. 1 is a cross-sectional view of a multifiber optical cable which is terminated by the method of the invention;

FIG. 2 is a perspective view of a segment of flexible tubing having a stranded strengthening member used in effecting the termination according to the invention;

FIG. 3 is a perspective view of a multifiber cable with its outer jacket cut back to expose or break out optical fiber-containing buffer tubes and having polymeric tubing segments of FIG. 2 (on a smaller scale) slipped over the buffer tubes;

FIG. 4 is an elevation view of a three-legged, heat-shrinkable boot;

FIG. 5 is a perspective view of the boot of FIG. 4 being slipped over the polymeric tubing-sheathed buffer tubes of FIG. 3;

FIG. 6 is an elevation view of the boot fully applied to the cable with a unitary end surrounding the cut end of the jacket and three legs each surrounding roughly one-third of the tubing-sheathed buffer tubes;

FIG. 7 is an elevation view, partially cut away, of the stranded strengthening member of the tubing segments being attached to a conventional fiber optic connector; and FIG. 8 is an elevation view, partially in section, of a pair of optic fibers optically joined together within a common sleeve by a pair of the connectors of FIG. 7.

DETAILED DESCRIPTION OF THE PREFERRED EMBODIMENT

The invention provides an improved method of terminating the several fibers 10 of multifiber optical cable 12, i.e., optically joining ends of the optical fibers in a light signal transmission system. The cable 12, as seen in FIG. 1, has a plurality, e.g., 3 to 24, of optical fibers 10 each loosely encased in a protecting buffer tube 14 which is, in turn, surrounded by an outer jacket 16. To prevent the cable 12 from kinking and snapping the glass optical fibers 10, the buffer tubes 14 are firmly held by the jacket 16 in surrounding relationship to a central strengthening member 18, which is formed of extruded polymeric tubing 19, e.g., tubing formed of polyvinyl chloride, encasing multiple strands 22 of an aramid yarn, such as that sold under the tradename Kevlar by duPont de Nemours & Co. Inc. Aramid yarns are very useful for strengthening optical fiber conduits and cables because they do not stretch and they provide excellent stress relief for the optical fibers.

The method of the invention utilizes polymeric tubing segments 24, such as that shown in FIG. 2 containing multistranded yarn, e.g., Kevlar, as a strengthening member. The polymeric, e.g., polyvinyl chloride, tubing is used to sheath the buffer tubes 14 between their breakout from the outer jacket 16 and the insertion of the optical fibers 10 into the termination connectors 28 (FIGS. 7 and 8). The strengthening yarn 26 of each tubing segment 24 is connected at one end to the cable 12 and at the other end by adhesive and/or a retaining ring or ferrule 32 to the connectors 28. The connection of the strengthening yarn 26 of each tubing segment 24 to the bundle of buffer tubes 14 at the inner end to the connectors at the outer end provides a highly pull-out resistant interconnection between the cable 12 and the connectors 28 which relieves stress on the optical fibers 10 themselves.

After the cable 12 has been cut to its desired length, the outer jacket 16 is cut back sufficiently to breakout or expose lengths of buffer tube-encased optical fiber 10 so that the individual optical fibers may be inserted in connectors 28 that optically join the fibers to various transmitting or receiving units at the termination site. Typically, about three feet of the outer jacket 16 is removed. Care is taken so that the buffer tubes 14 are not nicked when the end of jacket 16 is removed. This is most easily accomplished by using a tool that features a blade with an adjustable cutting depth. The blade is set so that it cuts 90% of the way through the jacket. A longitudinal incision is first made from the end of the jacket and the jacket is separated down the incision. The jacket 16 is separated along the incision and removed along a circumferential cut at the end of the incision. Mylar tape, which frequently lines the jacket, is also removed. Any empty buffer tubes are cut flush with the end of the jacket.

A segment of polymeric tubing 24 is cut for sheathing each fiber 10 a few inches shorter than the exposed end portions of the buffer tubes 14. Care is taken to insure that the yarn 26 within the tubing segment 24 is cut to the same length as the polymeric tubing. From one end of each tubing segment 24, about 1 to 4 inches, preferably about 2 inches, of tubing, is cut taking care not to cut the yarn. The exposed yarn is folded back along the outside of the tubing segment and held thereto, e.g., with tape 36 as seen in FIG. 2. The end of each buffer tube 14 is trimmed so that it is flat and free from rough edges which might catch the tubing segments 24. The tubing segments are then each slid, prepared end 38 first, onto each buffer tube 14. This procedure is done with care, the tubing segment 24 slid about one inch at a time making sure that the buffer tube 14 does not kink and damage the optical fiber 10. It may happen that an end of a buffer tube 14 hangs up on the sliding tubing segment 24, and if this happens, it is necessary to release the buffer tube 14. Release of a hung-up buffer tube 14 may be accomplished by gently stretching and releasing the tubing segment 24 while holding its prepared inner end 38. This procedure is repeated as often as necessary until the tubing segment 24 is slid fully onto the buffer tube 14 leaving up to about one inch of discontinuity 40 (FIG. 3) between the prepared inner end 38 of the tubing segment 24 and the end of the jacket 16. As each tubing segment 24 is drawn over the buffer tube 14, it is appropriately marked for identification, e.g., with a self-adhesive label 42 with the code on the corresponding buffer tube.

After all the buffer tubes 14 are encased in tubing segments 24 and labeled, the tape 36 holding the yarn to the sides of the prepared ends 38 is removed and the yarn 26 is helically wound about the exposed bundle of buffer tubes and attached thereto with adhesive as seen in FIG. 3. An epoxy, prepared according to the manufacturer's instruction is most suitable for this purpose. The glued yarn strands 26 are smoothed, and the epoxy is allowed to cure for a short period of time, preferably at least about seven minutes, depending, of course, on the epoxy used.

The discontinuity 40 between the end of the cable jacket 16 and the inner ends 38 of the tubing segments is preferably covered by an outer boot 30 which extends over the jacket 16 at one end and over the tubing segments 24 at its other end. Although a cylindrical boot could be used, a multi-legged boot 30 is preferably used having a large cylindrical portion 46 at one end which extends over the yarn-wrapped buffer tubes 14 in the discontinuity 40 and the end of the jacket 16, and a plurality, e.g., three, of cylindrical legs 48 at its other end which each cover the inner ends 38 of a bundle of the tubing segments 24. The boot 30 is preferably heat shrinkable permitting it to be selected of a size that slides easily over the tubing segments 24 and partially over the end of the jacket 16 and then shrunk to bind the end of the jacket to the ends 38 of the tubing segments 24 upon the application of heat. Heat shrinkable boots formed of polyolefin and suitable for this application are commercially available.

The boot is slid over the tubing segment-sheathed buffer tubes 14, as shown in FIG. 6, with approximately an equal number of sheathed buffer tubes extending through each leg 48. The strengthening member 18 of the cable 12 also extends through one of the boot legs 48. The fully applied boot 30, with its inner portion 46 covering the cut end of the jacket 16 and its legs around the inner ends 38 of the tubing segments 24, is shrunk into a tight fit by application of heat, e.g., with a heat gun, taking care not to overheat the jacket or tubing segments. The boot 30 forms a tight junction between the tubing segments 24 and the jacket 16, and the bundling of small groups of tubing segments in the individual boot legs 48 reduces the interstices between the tubing segments helping to keep moisture out of the cable. Fibers 10 of the cable 12 are thus each prepared for termination to an appropriate connector 28 with the buffer tubes 14 each individually strengthened by the yarn-containing tubing segments 24.

The broken-out fibers 10, with their surrounding buffer tubes 14 and tubing segments 24, may now be treated as individual fiber conduits and terminated as single fiber conduits in standard connectors 28. The outer end of each tubing segment 24, which by virtue of cutting it to a proper length, should be somewhat recessed from the end of the buffer tube 14 and fiber 10, is cut back to expose a length of yarn 26. (This may have been done prior to slipping the tubing segment on the buffer segment.) The end of the buffer tube 14 is cut back so that its end extends outward of the end of the tubing segment 24 but terminates inward of the end of the yarn 26. Each broken-out fiber 10 is thus prepared for insertion into a standard connector 28, such as those sold under the trade name Amphenol Series 905/906 Fiber Optic Connectors by Bunker Ramo Corporation and illustrated in FIGS. 7 and 8.

The connector 28 has a cylindrical body 64 and a narrower rear segment 65 having an axial bore 66 proportioned to receive the exposed end of the buffer tube 14 and a tip 68 with a narrow coaxial bore 70 that receives the optical fiber 10. The tip 68 is proportioned to fit closely within a sleeve 72, such as that shown in FIG. 8, which optically joins one terminated fiber 10 to another by holding them in very close proximity, or a receptacle (not shown) which connects the terminated fiber end to an optical transmitter or receiver. A nut 74 around the body 64 serves to firmly fasten the connector 28 to a threaded end 75 of a splice adaptor 77 which surrounds the alignment sleeve 72. The exterior surface 80 of the rear segment 65 is knurled providing a grip during insertion of the fiber 10 and providing a more secure attachment to the yarn 26 which is glued and clamped thereto.

Prior to insertion of the fiber end into the connector 28, a short segment of heat shrinkable tubing 82 and the crimping ferrule 32 are slipped over the tubing segment 24. If the fiber 10 is coated, the coating at its end is scraped and/or dissolved away, e.g., with acetone. A glue, such as epoxy, is applied to the exposed fiber 10 and buffer tube 14, and the fiber and buffer tube are inserted through the back end of the connector as far as the buffer tube will go, thereby extending the optical fiber from the front end of the tip 68. As the fiber 10 and buffer tube 14 are inserted, the rear segment 65 of the connector is slipped under the exposed yarn 26, and glue is applied to the yarn to adhere it to the knurled surface 80. The crimping ferrule 32 is then forced over the yarn-surrounded rear segment 65 and crimped into a tight fit thereon. A bead of glue 85 is applied to the front end of the tip 68 around the optical fiber 10.

After the glue has set, the fiber 10 is scribed at the end of the tip 68 with a fiber cleaving tool, and the fiber is broken by pulling it away from the connector 28. The tip 68 is inserted in a polishing tool for optically polishing the end of the fiber 10 held therein.

Any yarn 26 that extends from the front of the ferrule 32 is trimmed away as much as possible. Then, the heat shrinkable tubing 82, which is somewhat longer than the ferrule 32 in order to seal the junction between the ferrule and tubing segment 24, is slipped over the ferrule and partially over the body 64 and shrunk into place with a heat gun. The tip 68 of the connector 28 is then inserted into the sleeve 72, the sleeve is inserted in the splice adaptor 77 and the connector is fastened to the adaptor with the nut 74.

The advantages of the present invention may now be more fully appreciated. By sheathing the broken-out fibers in yarn strengthened segments, each of the broken-out fibers may be treated as a single optic conduit and terminated with a conventional high performance connector which provides upwards of 100 pounds of pull-out strength as opposed to the 5 pounds of pullout strength commonly achieved when gluing the bared fiber and buffer tube broken out from a multifiber cable into a conductor. The yarn, and not the fiber, bears the weight of the cable at the break-out point of the buffered fibers from the jacket. A high strength connection is provided between the sheathing tubing segments and the cable, and the surrounding boot generally seals the open end of the cable and provides a neat appearance to the cable termination. The termination is field installable.

While the invention has been described in terms of a preferred embodiment, modifications obvious to one with ordinary skill in the art may be made without departing from the scope of the invention. For example, the covering of discontinuity between the tubing segments and the jacket may be effected by other means than with a boot, e.g. with tape wrapped around the discontinuity, and in some cases the discontinuity may be left uncovered.

Various features of the invention are set forth in the following claims.

What is claimed is:

1. A method of breaking out individual optical fibers from a multifiber optical cable and connecting each of the optical fibers to a connector, said method comprising the steps of:

removing more than one foot of the multifiber cable jacket from the end of the cable to expose the individual optical fibers, cutting individual flexible tubing segments to sizes shorter than the exposed length of the individual optical fibers, folding opposite ends of the strengthening members on the tubing segments back around the ends of the cut tubing segments, securing the ends of the reinforcing members to opposite ends of the tubing segments, telescoping each of the tubing segments with the folded back ends of the reinforcing members onto an optical fiber and about its buffer tube, spacing the inner ends of the telescoped tubing segments from the cut end of the cable jacket to provide a junction region, detaching the folded back inner ends of the strengthening members from the tubing segments and adhesively securing these inner ends to the buffer tubes of the optical cable at the junction region between the inner ends of the tubing segments and the cut end of the jacket, covering the adhesively secured ends of the strengthening members and the buffer tubes at the junction region, and connecting each optical fiber to a connector and adhesively connecting each of the outer ends of the strengthening members, each providing the pull-out strength between the multifiber cable and the respective connectors for each of the optical fibers and with the individual optical fibers each covered by a flexible tubing segment between its connector and the cable.

* * * * *